(12) United States Patent
Quan et al.

(10) Patent No.: US 10,121,580 B2
(45) Date of Patent: Nov. 6, 2018

(54) GLUING DEVICE, GLUING METHOD AND COLLOID FOR PACKAGING DEVICES

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Wei Quan, Beijing (CN); Chiahao Chang, Beijing (CN); Chinlung Liao, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 168 days.

(21) Appl. No.: 14/436,317

(22) PCT Filed: Jul. 31, 2014

(86) PCT No.: PCT/CN2014/083374
§ 371 (c)(1),
(2) Date: Apr. 16, 2015

(87) PCT Pub. No.: WO2015/143812
PCT Pub. Date: Oct. 1, 2015

(65) Prior Publication Data
US 2016/0276084 A1    Sep. 22, 2016

(30) Foreign Application Priority Data

Mar. 28, 2014 (CN) .......................... 2014 1 0122809

(51) Int. Cl.
*B32B 41/00* (2006.01)
*H01F 7/20* (2006.01)
(Continued)

(52) U.S. Cl.
CPC ............ *H01F 7/206* (2013.01); *B05C 5/0225* (2013.01); *B05D 1/26* (2013.01); *C09J 9/00* (2013.01);
(Continued)

(58) Field of Classification Search
CPC . H01F 7/206; H01F 1/0571; C09J 9/00; C09J 11/04; B05C 5/0225; B05D 1/26; B05D 3/20; H01L 51/56; H01L 51/5246
(Continued)

(56) References Cited

U.S. PATENT DOCUMENTS 7,108,584 B2    9/2006  Yamamoto
2003/0095897 A1*  5/2003  Grate ........................ B03C 1/00
422/186

(Continued)

FOREIGN PATENT DOCUMENTS

CN         1650162 A      8/2005
CN       102407212 A      4/2012
(Continued)

OTHER PUBLICATIONS

Office Action in Chinese Patent Application No. 201410122809.1, dated Sep. 29, 2015.
(Continued)

*Primary Examiner* — Michael N Orlando
*Assistant Examiner* — Joshel Rivera
(74) *Attorney, Agent, or Firm* — Brooks Kushman P.C.

(57) ABSTRACT

The present disclosure provides a gluing device, a gluing method and a colloid for packaging devices. The gluing device includes an instillation head configured to guide a glue added with magnetic material in an instillation direction; and a magnetic field generation mechanism configured to apply a magnetic field within the instillation head, so as to apply a force to the magnetic material through the
(Continued)

magnetic field in a direction identical to or opposite to the instillation direction. Thus a flow rate of the glue in the instillation direction is controlled through the force applied by the magnetic material to the glue. The glue in the gluing device may be smoothly dripped out at a constant flow rate, thereby to prevent the occurrence of discontinuous or thin glue lines in the related art due to an insufficient pressure during gluing.

20 Claims, 4 Drawing Sheets

(51) Int. Cl.
  *B05D 1/26* (2006.01)
  *B05C 5/02* (2006.01)
  *C09J 9/00* (2006.01)
  *C09J 11/04* (2006.01)
  *H01F 1/057* (2006.01)
  *B05D 3/00* (2006.01)
  *H01L 51/52* (2006.01)
  *H01L 51/56* (2006.01)

(52) U.S. Cl.
  CPC ............ *C09J 11/04* (2013.01); *H01F 1/0571* (2013.01); *B05D 3/20* (2013.01); *H01F 1/0578* (2013.01); *H01L 51/5246* (2013.01); *H01L 51/56* (2013.01)

(58) Field of Classification Search
  USPC ............................ 156/64, 350, 351, 378, 379
  See application file for complete search history.

(56) References Cited

U.S. PATENT DOCUMENTS

| | | | |
|---|---|---|---|
| 2004/0195278 A1* | 10/2004 | Leeuw | B05C 5/0225 222/504 |
| 2005/0124164 A1 | 6/2005 | Sakata et al. | |
| 2006/0243758 A1* | 11/2006 | Parks | B05B 1/3053 222/504 |
| 2007/0092660 A1 | 4/2007 | Shim et al. | |
| 2010/0171064 A1 | 7/2010 | Shim et al. | |

FOREIGN PATENT DOCUMENTS

| | | |
|---|---|---|
| CN | 102476088 A | 5/2012 |
| CN | 102484946 A | 5/2012 |
| CN | 102636918 A | 8/2012 |
| CN | 203389825 U | 1/2014 |
| CN | 103909040 A | 7/2014 |
| EP | 1 099 483 A1 | 5/2001 |
| KR | 2010-0051188 A | 5/2010 |

OTHER PUBLICATIONS

International Search Report and Written Opinion in PCT International Application No. PCT/CN2014/083374, dated Jan. 8, 2015.
Jingkang Bing, "Practical Handbook for Electrical Materials," China Electric Power Press, Feb. 2003, pp. 428-432.
Office Action in Chinese Patent Application No. 201410122809.1, dated Mar. 23, 2016.

* cited by examiner

GLUING DEVICE, GLUING METHOD AND COLLOID FOR PACKAGING DEVICES

CROSS-REFERENCE TO RELATED APPLICATIONS

This present application is the U.S. national phase of PCT Application No. PCT/CN2014/083374 filed on Jul. 31, 2014, which claims a priority of the Chinese patent application No. 201410122809.1 filed on Mar. 28, 2014, which is incorporated herein by reference in its entirety.

TECHNICAL FIELD

The present disclosure relates to the field of packaging device, in particular to a gluing device, a gluing method and a colloid for packaging devices.

BACKGROUND

Currently, it is an indispensable process in the field of manufacturing a display device to package devices. For example, during the manufacture of an organic light emitting diode display which is also referred as organic electroluminescence display (OLED), the service life of the OLED will be prolonged when the OLED is packaged in a better manner.

In a conventional package for the OLED, devices are usually packaged using a UV-curing epoxy resin. When packaging the OLED devices, it is required to coat epoxy resin glue at a large region, so as to adhere plates together. In order to improve the production efficiency, usually a gluing machine is used. For a conventional gluing machine, a glue is coated on a glass plate through an air pressure or a pressure applied by a screw, and then the glue drips under action of a downward force. However, sometimes an out-gluing quantity is not enough due to the insufficient air pressure or pressure applied by the screw, and the gluing is defective due to factors as high viscosity of the glue. Such a phenomenon as discontinuous or thin glue lines, and thereby a defect 1, as shown in FIGS. 1 and 2 will occur. As a result, a packaging effect will be adversely affected.

SUMMARY

An object of technical solutions of the present disclosure is to provide a gluing device, a gluing method and a colloid for packaging devices, so as to control an outflow rate of a glue in a gluing machine, thereby to prevent the occurrence of discontinuous and thin glue lines in the related art due to an uneven air pressure or pressure force during gluing.

The present disclosure provides a gluing device, including:
an instillation head configured to guide a glue added with magnetic material in an instillation direction; and
a magnetic field generation mechanism configured to apply a magnetic field within the instillation head, so as to apply a force to the magnetic material through the magnetic field in a direction identical to or opposite to the instillation direction.

Alternatively, the magnetic field generation mechanism includes an electromagnetic coil surrounding the instillation head.

Alternatively, the instillation head includes an instillation outlet and a tube body connected to the instillation outlet, and the magnetic field generation mechanism includes an electromagnetic coil surrounding a periphery of the tube body.

Alternatively, the gluing device further includes a driving mechanism configured to apply a pressure onto the glue within the instillation head so as to move the glue toward the instillation outlet in the instillation direction.

Alternatively, the gluing device further includes:
a monitoring mechanism configured to monitor an induction current in the magnetic field, and calculate a flow rate of the glue in the instillation direction in accordance with a change in the induction current; and
a controller configured to regulate a current supplied to the magnetic field generation mechanism in accordance with a difference between the flow rate of the glue provided by the monitoring mechanism and a desired flow rate.

Alternatively, the magnetic material is of a particle size of 5 to 15 μm, and a weight percentage of the magnetic material relative to the glue is less than 5%.

Alternatively, the magnetic material is NdFeB rare earth magnet particles.

The present disclosure provides in one embodiment a gluing method, including:
adding magnetic material into a glue to be instilled in such a manner that the magnetic material is dispersed in the glue; and
applying a magnetic field in an instillation head filled with the glue when the glue is being instilled, so as to apply a force to the magnetic material through the magnetic field in a direction identical to or opposite to an instillation direction.

Alternatively, the step of applying the magnetic field in the instillation head filled with the glue includes surrounding the instillation head with an electromagnetic coil.

Alternatively, the instillation head includes an instillation outlet and a tube body connected to the instillation outlet, and the step of applying the magnetic field in the instillation head filled with the glue includes surrounding a periphery of the tube body with an electromagnetic coil.

Alternatively, the step of applying the magnetic field in the instillation head filled with the glue so as to apply the force to the magnetic material through the magnetic field in a direction identical to or opposite to the instillation direction includes:
when requiring the glue to have a flow rate in the instillation direction, providing the electromagnetic coil with a current so as to move the magnetic material in the instillation direction, and changing a value of the current so as to change a value of the force applied to the magnetic material in the instillation direction; and
when requiring the glue to be stationary relative to the instillation head, providing the electromagnetic coil with a current so as to move the magnetic material in a direction opposite to the instillation direction, and changing a value of the current so as to change a value of the force applied to the magnetic material in the direction opposite to the instillation direction.

Alternatively, the gluing method further includes:
monitoring an induction current of the magnetic field, and calculating a flow rate of the glue in the instillation direction in accordance with a change in the induction current; and
regulating a current for generating the magnetic field in accordance with a difference between the flow rate of the glue and a desired flow rate.

Alternatively, the step of regulating the current for generating the magnetic field in accordance with the difference between the flow rate of the glue and the desired flow rate includes:

when the induction current is increased and an increment exceeds a first predetermined value, acquiring a calculation result that the flow rate of the glue is increased relative to the desired flow rate, and reducing a magnetic field intensity of the magnetic field, so as to reduce the value of the force applied by the magnetic field to the magnetic material, thereby to reduce the flow rate of the glue in the installation direction;

when the induction current is decreased and a decrement exceeds a second predetermined value, acquiring a calculation result that the flow rate of the glue is decreased relative to the desired flow rate, and increasing the magnetic field intensity of the magnetic field, so as to increase the value of the force applied by the magnetic field to the magnetic material, thereby to increase the flow rate of the glue in the installation direction; and when the induction current is changed within a predetermined range, acquiring a calculation result that the flow rate of the glue is unchanged relative to the desired flow rate, and maintaining the magnetic field intensity of the magnetic field.

The present disclosure provides in one embodiment a colloid for packaging a device, including a glue and magnetic material dispersed in the glue.

Alternatively, the magnetic material is of a particle size of 5 to 15 μm, and a weight percentage of the magnetic material relative to the glue is less than 5%.

Alternatively, the magnetic material is NdFeB rare earth magnet particles.

Alternatively, surfaces of the magnetic materials are mutually exclusively.

DETAILED DESCRIPTION

In order to make the objects, the technical solutions and the advantages of the present disclosure more apparent, the present disclosure will be described hereinafter in conjunction with the drawings and the embodiments.

The present disclosure provides in one embodiment a gluing device, including:

an installation head configured to guide a glue added with magnetic material along an installation direction; and a magnetic field generation mechanism configured to apply an induced magnetic field within the installation head, so as to apply a force to the magnetic material through the induced magnetic field in a direction identical to or opposite to the installation direction.

According to the gluing device in one embodiment of the present disclosure, the magnetic material is added in the glue to be instilled, and the force in a direction identical to or opposite to the installation direction is applied to the magnetic material through the induced magnetic field applied in the installation head, so as to control a flow rate of the glue in the installation direction through the force applied by the magnetic material to the glue. As a result, it is able to facilitate the installation of the glue in the gluing device at a constant flow rate, thereby to prevent the occurrence of discontinuous or thin glue lines during gluing in the related art due to an insufficient air pressured or pressure force.

For example, when the glue is not instilled smoothly due to the insufficient pressure force applied thereto, a force in a direction identical to the installation direction is applied by the induced magnetic field to the magnetic material. Under action of the magnetic field, the magnetic material moves the glue in the direction identical to the installation direction, so as to increase an installation rate of the glue. When the induced magnetic fields with different intensities are applied, the forces applied to the magnetic material in the installation direction are different from each other, so the installation rate of the glue will be affected differently.

When requiring the glue to be stationary relative to the installation head or an installation outlet thereof, a force in a direction opposite to the installation direction may be applied by the induced magnetic field to the magnetic material, so as to prevent the glue from flowing out from the installation outlet under action of gravity, thereby to prevent the device from being contaminated.

The present disclosure will be described hereinafter in conjunction with the drawings and the embodiments. The following embodiments are for illustrative purposes only, but shall not be used to limit the scope of the present disclosure.

Figure 1:
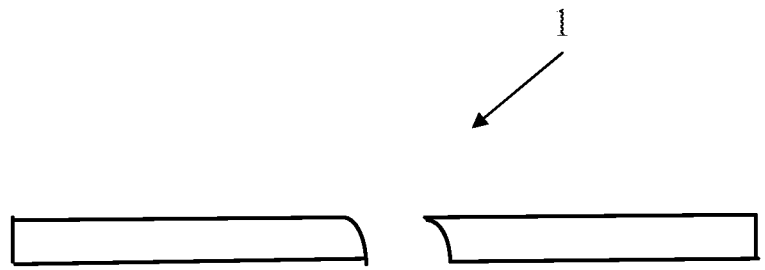
FIG. 1 is a schematic view showing a first defect generated during gluing in the related art.
Figure 2:
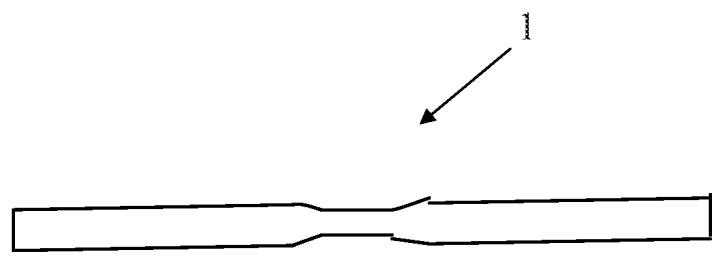
FIG. 2 is a schematic view showing a second defect generated during gluing in the related art.
Figure 3:
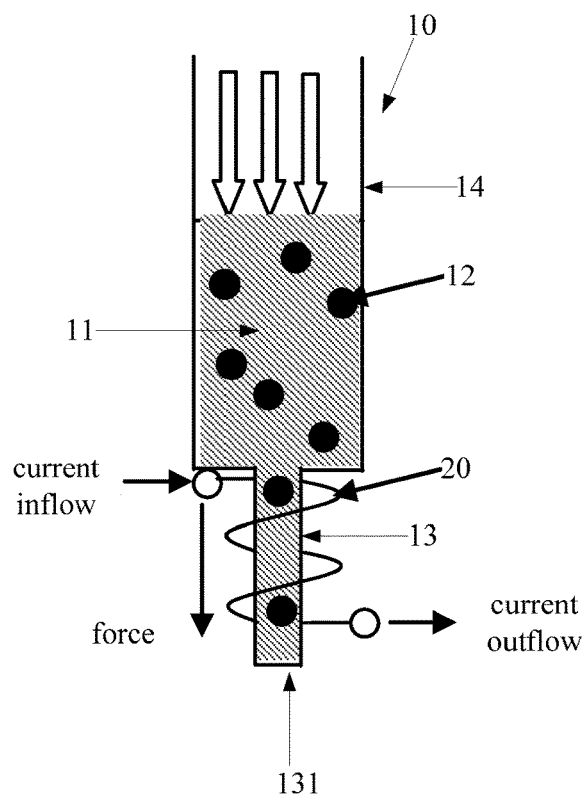
FIG. 3 is a partial schematic view showing a first utilization state of a gluing device according to one embodiment of the present disclosure.

FIG. 3 is a partial schematic view showing a gluing device according to one embodiment of the present disclosure. Referring to FIG. 3, the gluing device includes an installation head 10 in which a glue 11 added with magnetic material 12 is filled. Alternatively, the magnetic material 12 is dispersed evenly in the glue 11.

As shown in FIG. 3, the installation head 10 in one embodiment of the present disclosure includes an installation needle 13 and a storage tube 14 for storing a fixed content of the glue 11. An installation outlet 131 is formed at one end of the installation needle 13, e.g., a free end. The installation needle 13 and the storage tube 14 are combined to form an installation passage for guiding the glue 11. The glue 11 in the installation passage may flow out from the installation outlet 131 and onto a substrate to be coated under action of a pressure.

In one embodiment, in order to prevent the magnetic material 12 added in the glue 11 from being agglomerated, surfaces of the magnetic material 12 may be processed in advance, so that the magnetic material 12 are mutually exclusive. In addition, it should be appreciated that, when the magnetic material 12 is dispersed in the glue with high viscosity, the magnetic material 12 may not flow in the glue 11 easily and thus may maintain its dispersity in a better manner.

Further, in order to prevent the performance of the glue 11 from being adversely affected by the added magnetic material 12, alternatively, the added magnetic material 12 is of a particle size of 5 to 15 μm, particularly about 10 μm, and a weight percentage of the magnetic material 12 relative to the glue 11 is less than 5%.

When the glue 11 is mixed with the above magnetic material 12 and then stirred and deaerated, the magnetic material 12 may be dispersed in the glue 11 in a better manner along with a stirring procedure of the glue 11. In addition, in order to prevent the magnetic material 12 from being precipitated, usually the resultant glue 11 added with the magnetic material 12 shall be used within 24 hours.

Alternatively, the magnetic material is NdFeB rare earth magnet. Its characteristics are known in the art, and thus will not be repeated herein. In addition, the gluing device in one embodiment of the present disclosure further includes a magnetic field generation mechanism configured to apply an induced magnetic field in the instillation head 10. Referring to FIG. 3, the magnetic field generation mechanism includes an electromagnetic coil 20 surrounding a periphery of a tube body at the instillation outlet 131 (i.e., surrounding a peripheral of the instillation needle 13) in a direction away from the outlet 131.

By the presence of the electromagnetic coil 20, an induced magnetic field is generated when a current is supplied to the electromagnet coil 20. Since the electromagnetic coil 20 is arranged at the periphery of the instillation needle 13, thus the induced magnetic field also exists inside the instillation needle 13 and produces a force onto the magnetic material 12 within the instillation head 10.

A direction of the induced magnetic field excited by the current in an energized solenoid, i.e., the electromagnetic coil 20, and a direction of the current satisfy the Ampere's rule, i.e., the right-hand screw rule. In other words, when a person wraps his right hand around the electromagnetic coil 20 with four fingers in the direction of the current, the thumb points in the direction of the magnetic north pole of the electromagnetic coil 20. Based on this, when a winding direction of the electromagnetic coil 20 on the instillation needle 13 and the magnetism of the magnetic material 12 added in the glue 11 are determined, by changing the direction of the current supplied to the electromagnetic coil 20, the induced magnetic field of the electromagnetic coil 20 may generate a force exerted onto the magnetic material 12 in a direction identical to or opposite to the instillation direction. Meanwhile, by regulating a value of the current supplied to the electromagnetic coil 20, a value of the force applied by the induced magnetic field to the magnetic material 12 may be regulated, thereby to regulate the instillation rate of the glue 11 by means of the force exerted by the magnetic material 12 to the glue 11.

Utilization modes of the gluing device in one embodiment of the present disclosure will be described hereinafter.

Figure 4:
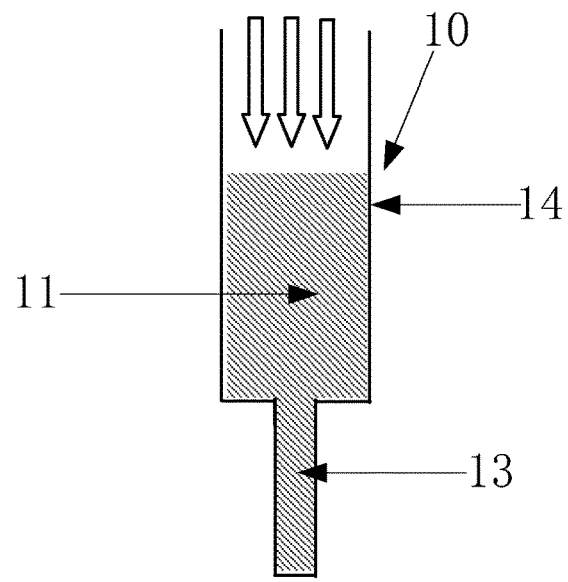
FIG. 4 is a schematic view showing a first driving mode of the gluing device according to one embodiment of the present disclosure.
Figure 5:
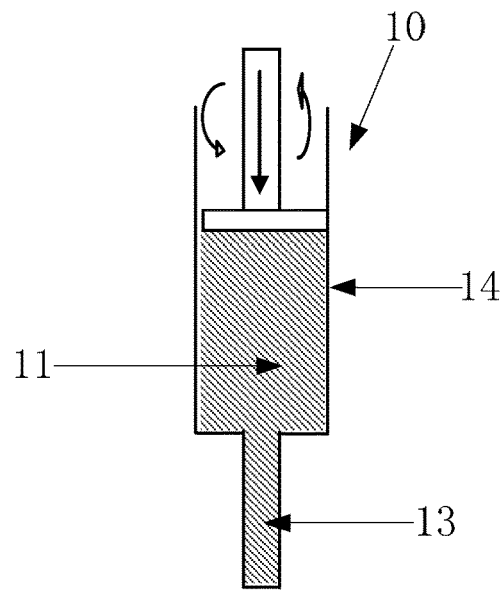
FIG. 5 is a schematic view showing a second driving mode of the gluing device according to one embodiment of the present disclosure.

The gluing device in one embodiment of the present disclosure further includes a driving mechanism for applying a pressure onto the glue 11 within the instillation head 10, so as to move the glue 11 toward the instillation outlet 131 along the instillation direction. Specifically, the driving mechanism may pressurize the glue 11 by means of an air pressure as shown in FIG. 4, or pressurize the glue 11 by a screw as shown in FIG. 5, so as to apply the glue 11 at a certain instillation rate.

Also referring to FIG. 3, when the glue is applied using the instillation head 10 of the gluing device in one embodiment of the present disclosure, the current is inputted into the electromagnetic coil 20 in accordance with a winding direction of the electromagnetic coil 20 and the magnetism of the magnetic material 12. Moreover, when an induced magnetic field is generated by the current inputted into the electromagnetic coil 20, a force is exerted onto the magnetic material 12 in the instillation direction (i.e., a downward direction as shown in FIG. 3) due to the direction of the current. As a result, it is able to increase the flow rate of the glue 11 during instillation, so as to accelerate dripping of the glue 11.

Figure 6:
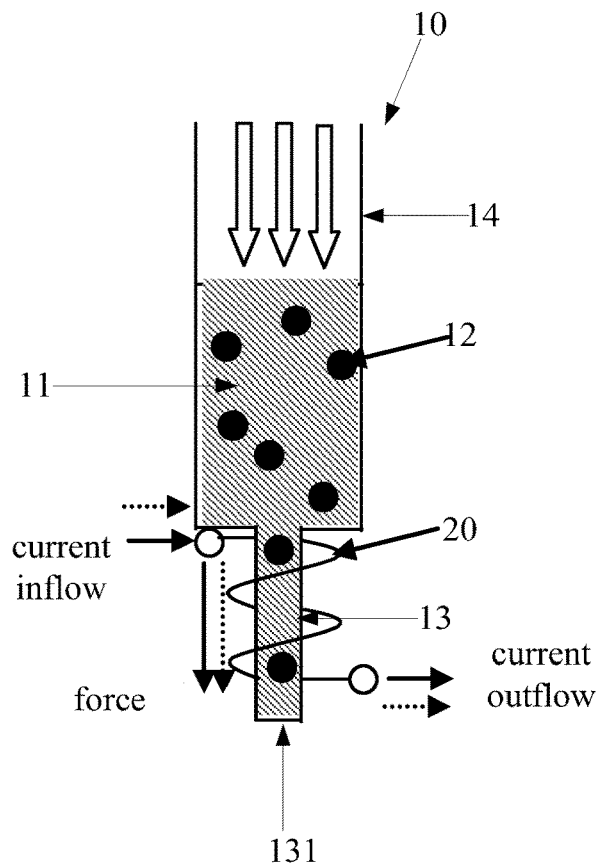
FIG. 6 is a partial schematic view showing a second utilization state of the gluing device according to one embodiment of the present disclosure.

In addition, along with the gluing progress, the amount of the glue 11 within the instillation head 10 is decreased gradually. No matter which kind of driving mechanisms is adopted, there is a difference between an actual force applied to the glue 11 and a desired force, so a resultant pattern formed by the glue differs to some extent from a pattern of the glue formed when more glue 11 is contained in the instillation head 10. In this regard, a value of the current inputted to the electromagnetic coil 20 is changed so as to increase or decrease the induced magnetic field intensity, thereby to increase or decrease the force exerted to the magnetic material 12 in the instillation direction. As a result, it is able to exert a uniform force onto the glue 11 and an out-gluing quantity is more evenly, as shown in FIG. 6.

Figure 7:
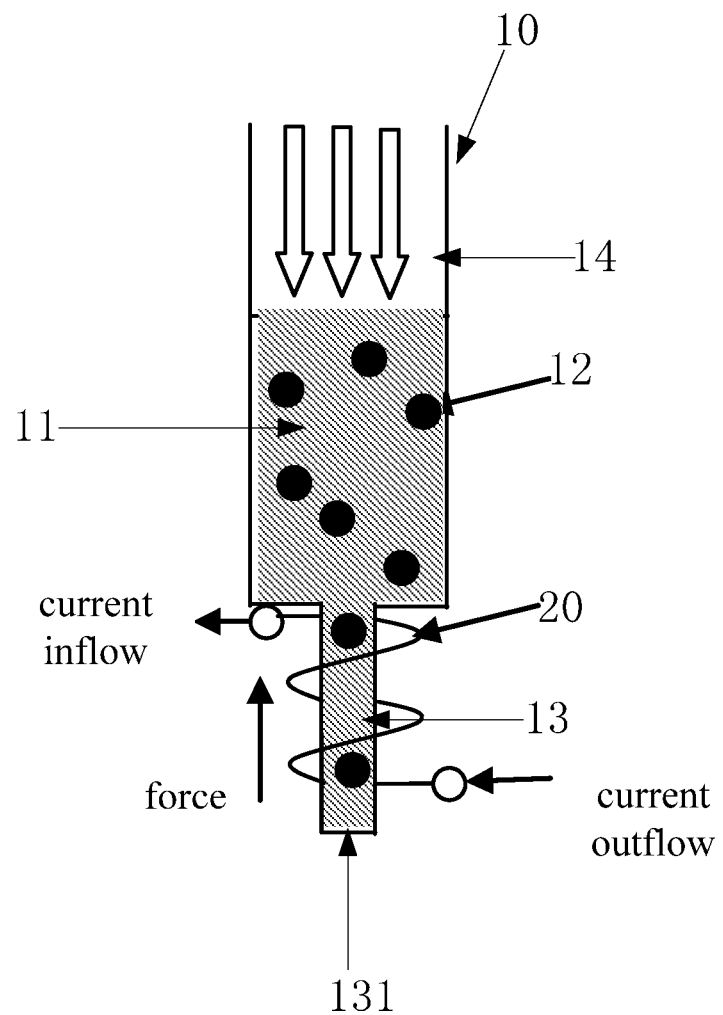
FIG. 7 is a partial schematic view showing a third utilization state of the gluing device according to one embodiment of the present disclosure.

Further, when the gluing process is completed and it is unnecessary to instill the glue 11, the glue 11 within the instillation head 10 needs to be stationary relative to the instillation outlet 131. Usually, the glue 11 may be instilled downward automatically due to the gravity, and the device may be contaminated. However, when the gluing device according to one embodiment of the present disclosure is adopted, as shown in FIG. 7, the direction of the current inputted to the electromagnetic coil 20 during the normal instillation procedure in FIG. 3 is changed so as to generate a new induced magnetic field, through which a force is exerted onto the magnetic material 12 in a direction opposite to the instillation direction (i.e., a vertically upward force when the instillation head 10 is at a position as shown in FIG. 7). As a result, it is able to prevent the glue 11 from dripping out of the instillation outlet 131.

Hence, according to the gluing device in one embodiment of the present disclosure, it is able to not only increase the instillation rate of the glue 11 but also control the instillation rate of the glue 11 to be more uniform as well as prevent the glue 11 from dripping out if necessary to avoid contamination.

Alternatively, the gluing device in one embodiment of the present disclosure further includes:

a monitoring mechanism configured to monitor an induction current of the induced magnetic field, and calculate the flow rate of the glue 11 in the instillation direction in accordance with a change in the induction current; and a controller configured to regulate a current supplied to the magnetic field generation structure in accordance with a difference between the flow rate of the glue 11 provided by the monitoring mechanism and a desired flow rate.

It should be appreciated that, when the magnetic field passing through a closed circuit is changed, an induction current may be generated in the closed circuit. In one embodiment of the present disclosure, the magnetic material 12 may be a permanent magnet or be magnetized by the induced magnetic field generated by the electromagnetic coil 20. When the magnetic material 12 flows through the electromagnetic coil 20 in the instillation direction under action of the induced magnetic field generated by the electromagnetic coil 20, a magnetic flux in the electromagnetic coil 20 is changed, and thus an induction current is generated in the electromagnetic coil 20. When the magnetic material 12 flows through the induced magnetic field at a constant flow rate, the resultant induction current is not changed. When the magnetic material 12 flows through the induced magnetic field at a variable flow rate, the resultant induction current is changed too. Hence, the induction current of the induced magnetic field may be monitored, and a change in the instillation rate of the glue 11 may be determined in accordance with the change in the induction current. For example, in one embodiment, a total current change in the electromagnetic coil 20 may be monitored to determine the change in the induction current, and then the change in the instillation rate of the glue 11 may be determined in accordance with the change in the induction current.

Specifically, a step of controlling the flow rate of the glue 11 in the instillation direction in accordance with the change in the induction current includes:

when the induction current is increased and an increment exceeds a first predetermined value, acquiring a calculation result that the flow rate of the glue 11 is increased relative to the desired flow rate, and reducing the magnetic field intensity of the induced magnetic field, so as to reduce the value of the force applied by the induced magnetic field to the magnetic material 12, thereby to reduce the flow rate of the glue 11 in the instillation direction;

when the induction current is decreased and a decrement exceeds a second predetermined value, acquiring a calculation result that the flow rate of the glue 11 is decreased relative to the desired flow rate, and increasing the magnetic field intensity of the induced magnetic field, so as to increase the value of the force applied by the induced magnetic field to the magnetic material 12, thereby to increase the flow rate of the glue 11 in the instillation direction; and when the induction current is changed within a predetermined range, acquiring a calculation result that the flow rate of the glue 11 is unchanged relative to the desired flow rate, and maintaining the magnetic field intensity of the induced magnetic field.

In other words, when monitoring that the induction current is changed within the predetermined range, it means that the instillation rate of the glue 11 is constant, thus, the magnetic field intensity of the induced magnetic field is maintained as constant, i.e., the value of the current in the electromagnetic coil 20 is unchanged. When monitoring that the increment of the induction current exceeds the first predetermined value, it means that the instillation rate of the glue 11 is increased and an abnormity occurs in the gluing process, then, it is required to reduce the force applied by the induced magnetic field to the magnetic material 12, i.e., to reduce the value of the current inputted to the electromagnetic coil 20, so as to reduce the flow rate of the glue 11 in the instillation direction. When monitoring that the decrement of the induction current exceeds the second predetermined value, it means that the instillation rate of the glue 11 is decreased and an abnormity occurs in the gluing process, then, it is required to increase the force applied by the induced magnetic field to the magnetic material 12, i.e., to increase the value of the current inputted to the electromagnetic coil 20, so as to increase the flow rate of the glue 11 in the instillation direction.

By adopting the above-mentioned structure, the gluing device of one embodiment of the present disclosure may monitor the instillation rate of the glue 11 in real time, thereby to enable the instillation rate to be constant.

The present disclosure further provides in one embodiment a gluing method. The gluing method includes:

adding magnetic material 12 into a glue 11 to be instilled in such a manner that the magnetic material 12 is dispersed in the glue 11; and applying an induced magnetic field in an instillation head 10 filled with the glue 11 when instilling the glue 11, so as to apply a force to the magnetic material 12 through the induced magnetic field in a direction identical to or opposite to an instillation direction.

According to the gluing method in one embodiment of the present disclosure, the magnetic material 12 is added in the glue 11 to be instilled, and the force is applied to the magnetic material 12 through the induced magnetic field in the instillation head 10 in a direction identical to or opposite to the instillation direction; in this way, the flow rate of the glue 11 in the instillation direction may be controlled by the force applied by the magnetic material 12 to the glue 11. As a result, the glue 11 in the gluing device may be smoothly instilled out at a constant flow rate, thereby to prevent the occurrence of the discontinuous or thin glue lines in the related art due to an insufficient air pressure or pressure force during gluing.

Specifically, the step of applying the induced magnetic field in the instillation head 10 filled with the glue 11 includes surrounding a periphery of a tube body of the instillation head 10 connected to the instillation outlet 131 with an electromagnetic coil 20. Specifically, the electromagnetic coil 20 surrounds the instillation head 10 for instilling the glue 11 in a direction away from the outlet 131.

The formation of the induced magnetic field in the instillation head 10 through the electromagnetic coil 20 may refer to FIG. 3, and will not be repeated herein.

In order to prevent the performance of the glue 11 from being adversely affected by the added magnetic material 12, alternatively, the added magnetic material 12 is of a particle size of 5 to 15 μm, particularly about 10 μm, and a weight percentage of the magnetic material 12 relative to the glue 11 is less than 5%.

In addition, the step of applying the induced magnetic field in the instillation head 10 filled with the glue 11 so as to apply the force to the magnetic material 12 through the induced magnetic field in a direction identical to or opposite to the instillation direction includes:

when requiring the glue 11 to have a flow rate in the instillation direction, providing the electromagnetic coil 20 with a current so as to move the magnetic material 12 in the instillation direction, and changing a value of the current so as to change a value of the force applied to the magnetic material 12 in the instillation direction; and when requiring the glue 11 to be stationary relative to the instillation outlet 131, providing the electromagnetic coil 20 with a current so as to move the magnetic material 12 in a direction opposite to the instillation direction, and changing a value of the current so as to change a value of the force applied to the magnetic material 12 in the direction opposite to the instillation direction.

According to the gluing method in one embodiment of the present disclosure, it is able to not only increase the instillation rate of the glue 11 but also control the instillation rate of the glue 11 to be more uniform as well as prevent the glue 11 from dripping out if necessary to avoid contamination.

Further, the gluing method further includes:

monitoring an induction current of the induced magnetic field, and calculating a flow rate of the glue 11 in the instillation direction in accordance with a change in the induction current; and regulating a current for generating the induced magnetic field in accordance with a difference between the flow rate of the glue 11 and a desired flow rate.

The step of regulating the current for generating the induced magnetic field in accordance with the difference between the flow rate of the glue 11 and the desired flow rate specifically includes:

when the induction current is increased and an increment exceeds a first predetermined value, acquiring a calculation result that the flow rate of the glue 11 is increased relative to the desired flow rate, and reducing a magnetic field intensity of the induced magnetic field, so as to reduce the value of the force applied by the induced magnetic field to the magnetic material 12, thereby to reduce the flow rate of the glue 11 in the installation direction;

when the induction current is decreased and a decrement exceeds a second predetermined value, acquiring a calculation result that the flow rate of the glue 11 is decreased relative to the desired flow rate, and increasing the magnetic field intensity of the induced magnetic field, so as to increase the value of the force applied by the induced magnetic field to the magnetic material 12, thereby to increase the flow rate of the glue 11 in the installation direction; and when the induction current is changed within a predetermined range, acquiring a calculation result that the flow rate of the glue 11 is unchanged relative to the desired flow rate, and maintaining the magnetic field intensity of the induced magnetic field.

By adopting the above-mentioned means, the gluing method in one embodiment of the present disclosure may monitor the installation rate of the glue 11 in real time, thereby to enable the installation rate to be constant.

In the above embodiments, the magnetic field generation mechanism uses the electromagnetic coil 20 to apply the induced magnetic field in the installation head 10. In the other embodiments, the magnetic field generation mechanism may also adopt other manners, such as a magnet, e.g., an electromagnet, arranged at one or two ends of the installation head 10 in the installation direction, to apply the magnetic field in the installation head 10 so as to move the magnetic material 12 in the installation direction or in a direction opposite to the installation direction.

In addition, the present disclosure further provides in one embodiment a colloid for packaging devices. As shown in FIG. 3, the colloid includes the glue 11 and the magnetic material 12 dispersed in the glue 11. In one embodiment, the magnetic material 12 is NdFeB rare earth magnet particles. The magnetic material 12 is of a particle size of 5 to 15 μm, and a weight percentage of the magnetic material 12 relative to the glue 11 is less than 5%, so as to prevent the performance of the glue 11 from being adversely affected. In addition, surfaces of the magnetic material 12 may be processed in advance, so as to enable the magnetic materials 12 to be mutually exclusive, thereby to prevent the magnetic materials 12 added in the glue 11 from being agglomerated.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A gluing device comprising:
an installation head configured to guide a glue added with magnetic material in an installation direction;
a magnetic field generation mechanism comprising an electromagnetic coil configured to apply a magnetic field within the installation head, so as to apply a force to the magnetic material through the magnetic field in a direction identical to or opposite to the installation direction;
a monitoring mechanism configured to monitor a total current change in the electromagnetic coil to determine a change in an induction current in the magnetic field, and calculate a flow rate of the glue in the installation direction in accordance with the change in the induction current; and
a controller configured to regulate a current supplied to the magnetic field generation mechanism in accordance with a difference between the flow rate of the glue provided by the monitoring mechanism and a desired flow rate;
wherein the gluing device further includes a driving mechanism configured to apply a pressure onto the glue within the installation head so as to move the glue toward the installation outlet in the installation direction, and the driving mechanism includes a slidable screw in the installation head and a slidable plate in the installation head; the slidable screw is perpendicularly mounted to the slidable plate.

2. The gluing device according to claim 1, wherein the electromagnetic coil surrounds the installation head.

3. The gluing device according to claim 1, wherein the installation head comprises an installation outlet and a tube body connected to the installation outlet; and the electromagnetic coil surrounds a periphery of the tube body; and the slidable screw is in the tube body; and the slidable plate is slidable in the tube body along an axis direction of the tube body, and an outer circumference of the slidable plate is in contact with an inner wall of the tube body.

4. The gluing device according to claim 1, wherein the magnetic material is of a particle size of 5 to 15 μm, and a weight percentage of the magnetic material relative to the glue is less than 5%.

5. The gluing device according to claim 1, wherein the magnetic material is NdFeB rare earth magnet.

6. A gluing method comprising:
adding magnetic material into a glue to be instilled in such a manner that the magnetic material is dispersed in the glue;
applying a magnetic field with an electromagnetic coil in an installation head filled with the glue when the glue is being instilled, so as to apply a force to the magnetic material through the magnetic field in a direction identical to or opposite to an installation direction;
applying a pressure onto the glue within the installation head by driving a slidable screw with a slidable plate perpendicularly mounted to the slidable screw in the installation head to move relative to the installation head, thereby moving the glue toward the installation outlet in the installation direction;
monitoring a total current change in the electromagnetic coil to determine a change in an induction current of the magnetic field, and calculating a flow rate of the glue in the installation direction in accordance with the change in the induction current; and
regulating a current for generating the magnetic field in accordance with a difference between the flow rate of the glue and a desired flow rate.

7. The gluing method according to claim 6, wherein the step of applying the magnetic field with the electromagnetic coil in the instillation head filled with the glue comprises surrounding the instillation head with the electromagnetic coil.

8. The gluing method according to claim 6, wherein the instillation head comprises an instillation outlet and a tube body connected to the instillation outlet; and the step of applying the magnetic field with the electromagnetic coil in the instillation head filled with the glue comprises surrounding a periphery of the tube body with the electromagnetic coil.

9. The gluing method according to claim 7, wherein the step of applying the magnetic field with the electromagnetic coil in the instillation head filled with the glue so as to apply the force to the magnetic material through the magnetic field in a direction identical to or opposite to the instillation direction comprises:
when requiring the glue to have a flow rate in the instillation direction, providing the electromagnetic coil with a current so as to move the magnetic material in the instillation direction, and changing a value of the current so as to change a value of the force applied to the magnetic material in the instillation direction; and
when requiring the glue to be stationary relative to the instillation head, providing the electromagnetic coil with a current so as to move the magnetic material in a direction opposite to the instillation direction, and changing a value of the current so as to change a value of the force applied to the magnetic material in the direction opposite to the instillation direction.

10. The gluing method according to claim 6, wherein the step of regulating the current for generating the magnetic field in accordance with the difference between the flow rate of the glue and the desired flow rate comprises:
when the induction current is increased and an increment exceeds a first predetermined value, acquiring a calculation result that the flow rate of the glue is increased relative to the desired flow rate, and reducing a magnetic field intensity of the magnetic field, so as to reduce the value of the force applied by the magnetic field to the magnetic material, thereby to reduce the flow rate of the glue in the instillation direction;
when the induction current is decreased and a decrement exceeds a second predetermined value, acquiring a calculation result that the flow rate of the glue is decreased relative to the desired flow rate, and increasing the magnetic field intensity of the magnetic field, so as to increase the value of the force applied by the magnetic field to the magnetic material, thereby to increase the flow rate of the glue in the instillation direction; and
when the induction current is changed within a predetermined range, acquiring a calculation result that the flow rate of the glue is unchanged relative to the desired flow rate, and maintaining the magnetic field intensity of the magnetic field.

11. A gluing device comprising:
an instillation head configured to guide glue having a magnetic material therein in an instillation direction;
an electromagnetic coil configured to apply a magnetic field within the instillation head, so as to apply a force to the magnetic material through the magnetic field in a direction along the instillation direction;
a total current charge monitoring configured to monitor a total current change in the electromagnetic coil to determine a change in an induction current in the magnetic field, and calculate a flow rate of the glue in the instillation direction in accordance with the change in the induction current;
a controller configured to regulate a current supplied to the magnetic field generation mechanism in accordance with a difference between the flow rate of the glue provided by the monitoring mechanism and a desired flow rate; and
a slidable screw with a slidable plate perpendicularly mounted to the slidable screw in the instillation head, the screw configured to drive the slidable plate to apply a pressure onto the glue within the instillation head so as to move the glue toward the instillation outlet in the instillation direction.

12. The gluing device according to claim 11, wherein the electromagnetic coil surrounds the instillation head.

13. The gluing device according to claim 11, wherein the instillation head comprises an instillation outlet and a tube body connected to the instillation outlet; and the electromagnetic coil surrounds a periphery of the tube body; and the slidable screw is in the tube body; and the slidable plate is slidable in the tube body along an axis direction of the tube body, and an outer circumference of the slidable plate is in contact with an inner wall of the tube body.

14. The gluing device according to claim 11, wherein the magnetic material comprises particles having a size of 5 to 15 μm, and a weight percentage of the magnetic material relative to the glue of less than 5%.

15. The gluing device according to claim 14, wherein the magnetic material comprises NdFeB rare earth magnet.

16. The gluing device according to claim 3, wherein a width of the slidable plate in a radial direction of the tube body is greater than a width of the instillation outlet in the radial direction of the tube body.

17. The gluing device according to claim 16, wherein the slidable screw and the instillation outlet are at two opposite sides of the slidable plate.

18. The gluing device according to claim 16, wherein a width of the tube body in the radial direction of the tube body is greater than the width of the instillation outlet in the radial direction of the tube body; the electromagnetic coil surrounds the periphery of the tube body and abuts against an end of the tube body.

19. The gluing device according to claim 13, wherein a width of the slidable plate in a radial direction of the tube body is greater than a width of the instillation outlet in the radial direction of the tube body.

20. The gluing device according to claim 13, wherein the slidable screw and the instillation outlet are at two opposite sides of the slidable plate.

* * * * *